F. B. LEONARD.
HAT SUPPORT.
APPLICATION FILED JULY 9, 1921.
1,424,833.
Patented Aug. 8, 1922.
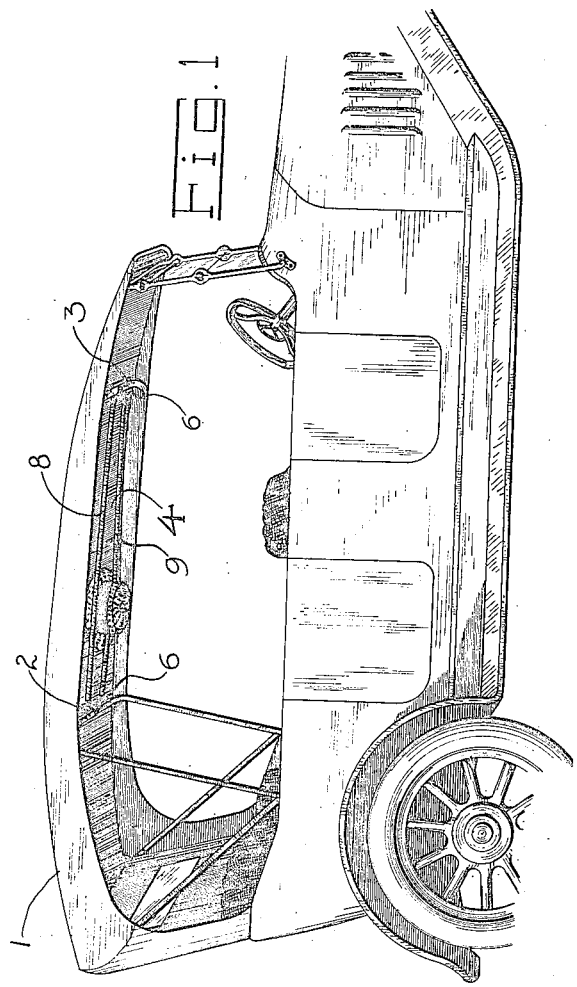
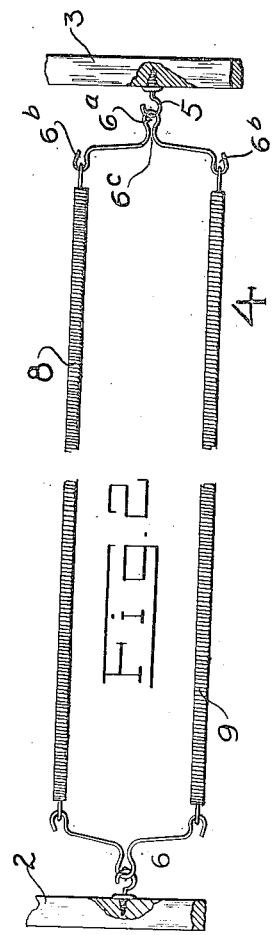
INVENTOR:
FRANK B. LEONARD
By: Oliver O. Mantz
HIS ATTORNEY

UNITED STATES PATENT OFFICE.

FRANK B. LEONARD, OF CHICAGO, ILLINOIS.

HAT SUPPORT.

1,424,833. Specification of Letters Patent. Patented Aug. 8, 1922.

Application filed July 9, 1921. Serial No. 483,613.

*To all whom it may concern:*

Be it known that I, FRANK B. LEONARD, a citizen of the United States, residing at Chicago, in the county of Cook and State of Illinois, have invented new and useful Improvements in Hat Supports, of which the following is a specification.

This invention has relation to means applicable to an automobile for supporting the hats of the occupants of the automobile.

The hats commonly used for street wear are not convenient for automobile travel, because they do not fit tightly over the wearer's head and as a consequence readily become blown off. For this reason it is found that the occupants of an automobile as a rule prefer to remove their street hats, and that they are as often at a loss to find a suitable place within the automobile to deposit their hats with safety.

With these conditions in view my invention resides in means for supporting such hats under the roof of an automobile top, this being about the only safe place available which is not occupied by other things.

The objects and purposes of the invention are hereinafter fully explained, and a drawing illustrating the invention is hereto annexed. Fig. 1 of said drawing shows an automobile top embodying the invention. Fig. 2 shows the structure of the invention detached from the top.

The automobile top 1 is of the usual type commonly attached during the summer season and it is known as a one-man top. Such top is made with a plurality of cross-braces 2, 3, designed to strengthen the top frame and to keep the fabric of the top tightly suspended so that it will not sag. The hat supporting device 4, which forms the important part of the invention is held suspended between a pair of the said braces, as indicated in Fig. 1 of the drawing.

The structure 4 comprises a pair of yokes 6, 7, between which a pair of flexible members 8, 9 are suspended in parallel relation, and it is important to note that the distance between these members is substantially the width of a hat crown. The flexibility of the members 8, 9 is sufficient to permit of inserting one or more hats in such a fashion that their brims take a position between said members and the fabric of the automobile top, as indicated in the drawing.

Each of the yokes 6, 7 may conveniently be made from a single piece of wire formed into a shape substantially as shown in the drawing and comprising a center loop $6^a$ for attachment to the brace 2, and of a hook $6^b$, at each end, on which to attach the members 8 and 9. In each of the braces 2 and 3 is seated a stud 5, such as a nail, screw, hook, or similar suitable device, on which the yoke is hung in the first place. I prefer to make the loop $6^a$ not entirely closed but with a neck portion $6^c$, through which the said stud is caused to pass when the yoke is attached to the automobile top.

The members 8, 9 are alike, and they are simply a pair of coil springs formed at their ends with eyes $8^a$, $9^a$ for attachment to the yoke hooks $6^b$, $7^b$. The assembly of the parts and their attachment to the braces of the automobile top is so simple and plainly illustrated that no further explanation is thought necessary.

A somewhat modified form of device is shown in Fig. 3. In this case the yokes take the shape of a pair of plates 10, between which a pair of wires 11, 12 are held suspended. For the purpose of adding flexibility to said wires, so that they will not crush the hat which they support, I have introduced a spring member 13 between each wire end and the adjacent yoke. In each plate is found an additional perforation, which serves to engage the stud of the automobile braces when the device is attached. The plates and the wires, when highly polished and electro-plated, may be more pleasing to the eye, but both forms of support are well suited for their purpose, and the first described device has been found less expensive to manufacture.

Further modifications may be found desirable, and I reserve the right to adopt such modifications, so long as they fall within the scope of the invention as set forth in the following claims.

I claim:

1. A hat support comprising a pair of yokes, each yoke shaped at the center to receive elements for fastening the device to the braces of an automobile top, and a pair of resilient members suspended between said yokes in parallel spaced relation, the distance between the members being substantially the width of a hat crown.

2. A hat support comprising a pair of yokes substantially the width of a hat crown and shaped at the center for attachment to an automobile top brace, a pair of flexible wire members, and coil springs connecting the ends of said members with the outer ends of said yokes, thereby maintaining said members yieldingly in parallel spaced relation.

3. The combination with a pair of studs in one or two braces of an automobile top, of a pair of yokes, each formed at the center for attachment to said studs, and a pair of resilient members shaped at the ends for attachment to the outer ends of said yokes, thereby yieldingly maintaining said members in parallel spaced relation.

4. A hat support comprising a pair of formed wire yokes, said yokes formed at the center with means for attachment to the braces of an automobile top, and a pair of coil-springs attachable to the ends of said yokes.

In testimony whereof I have hereunto affixed my signature.

FRANK B. LEONARD.